April 28, 1964 E. N. ALLBESON 3,130,830
APPARATUS FOR THE MECHANICAL HANDLING
OF BILLETS AND THE LIKE
Filed March 20, 1961 5 Sheets-Sheet 5

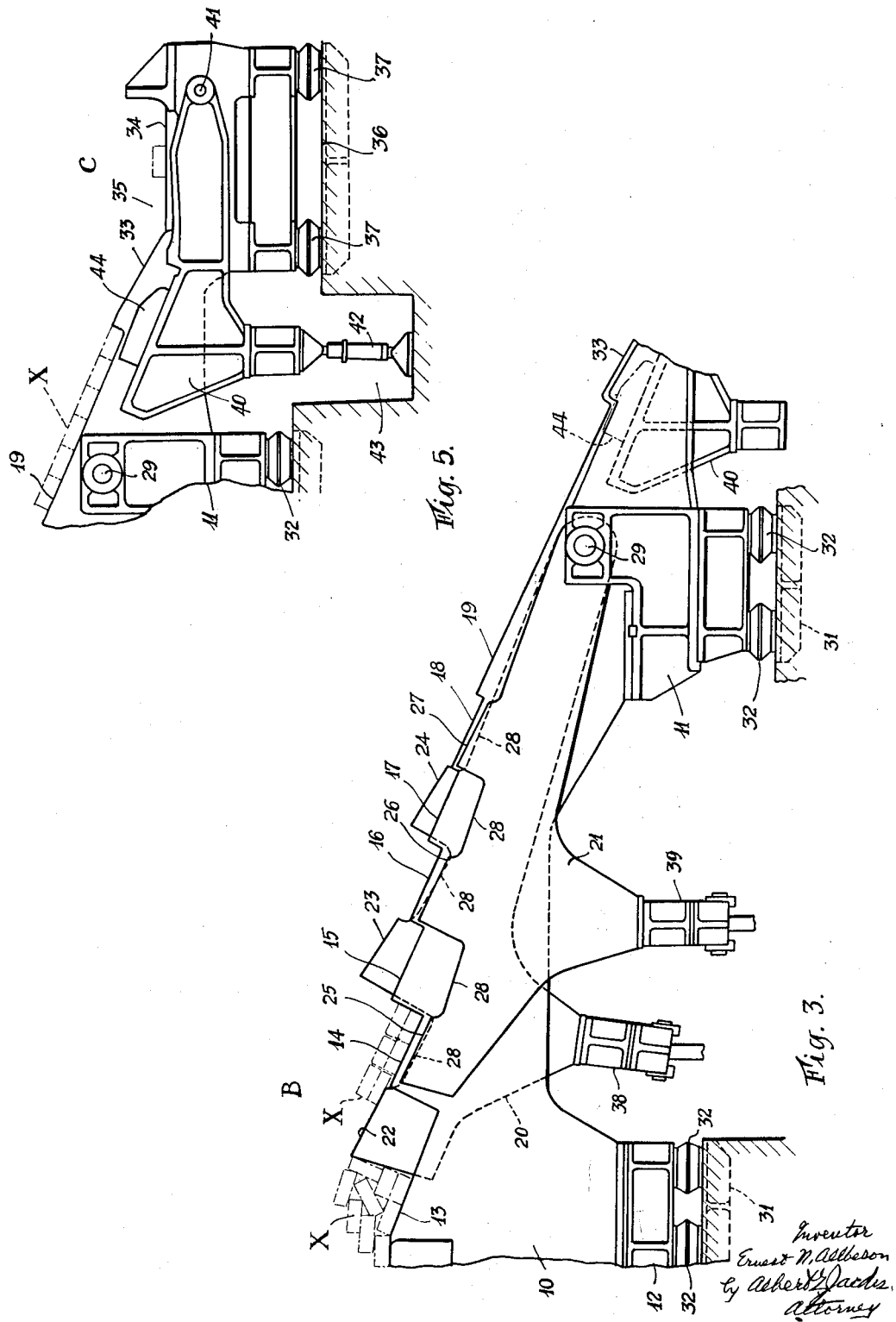

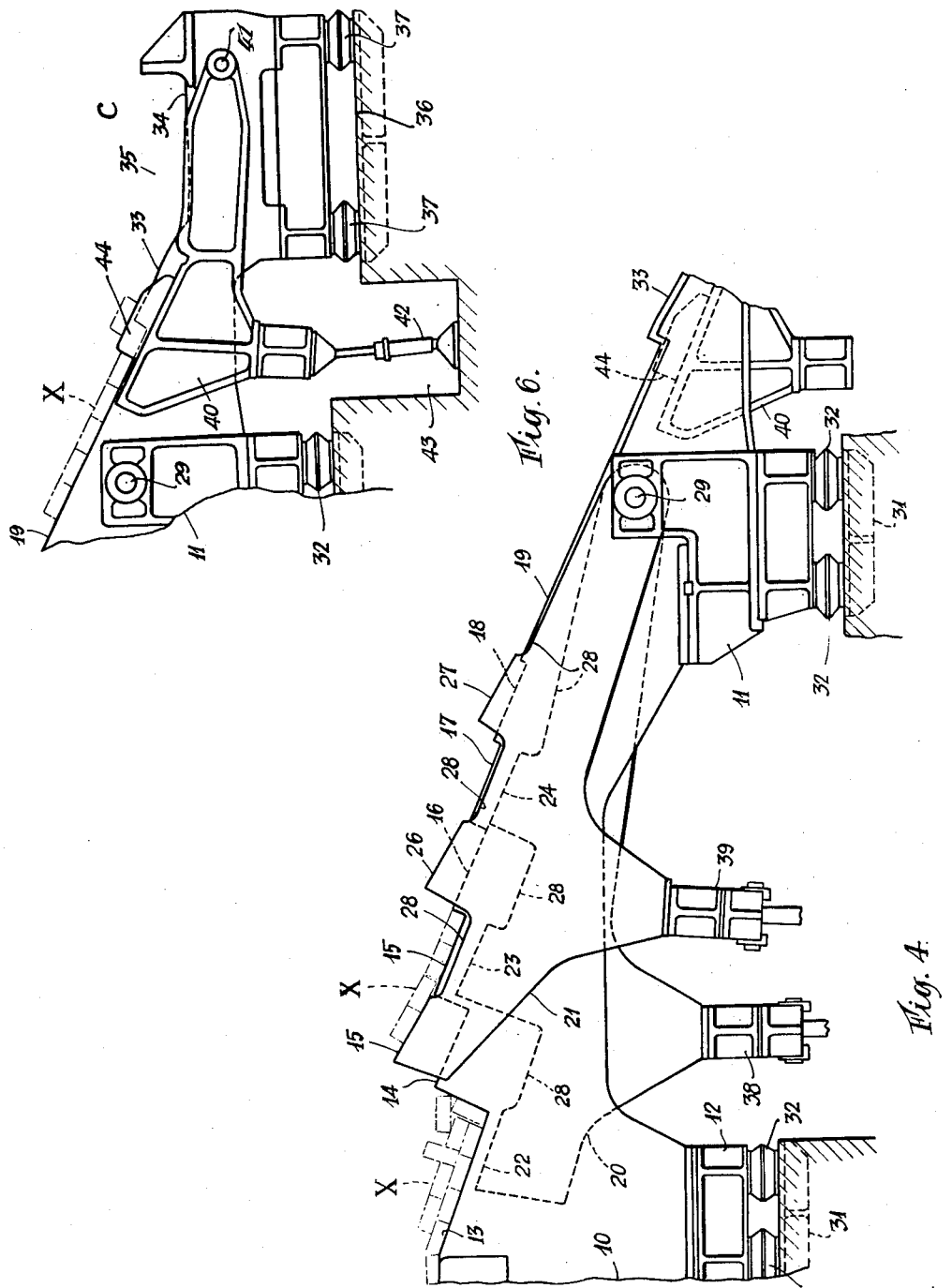

Inventor
Ernest N. Allbeson
by Albert L. Jackson
Attorney

United States Patent Office 3,130,830
Patented Apr. 28, 1964

3,130,830
APPARATUS FOR THE MECHANICAL HANDLING OF BILLETS AND THE LIKE

Ernest N. Allbeson, Grenoside, England, assignor to The Brightside Foundry & Engineering Co. Limited, Sheffield, England, a company of Great Britain and Northern Ireland
Filed Mar. 20, 1961, Ser. No. 96,956
7 Claims. (Cl. 198—219)

This invention relates to apparatus for the mechanical handling of billets and the like (hereinafter referred to for the sake of convenience as "billets") of the kind which includes a loading platform or grid, on to which billets are deposited in an indiscriminate heap or pile, and a conveyor by which the billets are conveyed from the loading platform or grid, by a movement of said billets in a direction transverse to their axes, to a discharge point at the front end of the conveyor to arrive thereat in orderly fashion for discharge therefrom and whereat the billets are transferred on to a run-off table for removal therefrom by a movement in the direction of the axes of said billets.

It is to be understood that for the purpose of this invention the term "billets" is intended to include billets of square cross section or near square cross section, that is to say, of a section in which the width to height ratio of the section is fairly close to the term "billets," also including what are known as slab billets having a cross section in which the width is greater than the height or thickness of said section, An object of this invention is to provide apparatus for the mechanical handling of billets which includes a conveyor for the billets and a run-off table at the discharge end thereof comprising a plurality of movable and stationary elongate billet-receiving elements spaced apart laterally in parallel, the upper surface of each said element being an niclined stepped surface to provide a series of inclined billet-receiving surfaces sloping downwardly towards the discharge end of the conveyor, the movable billet-receiving elements being mounted for rise and fall movement to constitute billet-lifting levers operable for transferring billets downwardly from one inclined surface to another of the stationary billet-receiving elements in a direction towards the discharge end of the conveyor for arrival thereat in orderly fashion, means being provided at said discharge end of the conveyor for transferring successive billets or multiples thereof to the run-off table for removal from the vicinity of the conveyor in the direction of the axes of said billets.

A further object of the invention is to provide that the billet-lifting levers are pivotally mounted at their one ends substantially in parallel on a common axis at or near the discharge end of the conveyor for rise and fall movement at their other and free ends in separate arcuate paths about their pivots, said free ends being supported by means operable about a fixed or shiftable axis for imparting to said elements their rise and fall movement or being supported by members which themselves are supported by means subjected to rise and fall movement.

A still further object is to mount the billet-lifting levers so that the free ends of alternate or other pre-selected ones thereof are connected to a floating support member separately from a floating support member to which the free ends of the remaining billet-lifting levers are similarly connected, said floating support members being oscillatingly moved in contrawise relation by common actuating mechanism for imparting the rise and fall movement to the billet-lifting levers.

These and other objects will be apparent from the following description in which reference is made to the accompanying drawings.

In the drawings:

FIG. 3 is a view of the conveyor showing the first step in the transfer of billets from one of the surfaces of a stationary billet-receiving and supporting element to the next at the feed end of the conveyor.

FIG. 4 is a similar view to FIG. 3 showing the second step in the transfer of billets.

FIG. 5 is a fragmentary view of the discharge end of the conveyor including the run-off table and pick-up means showing a single layer of billets having arrived at the terminal inclined surface of the conveyor.

FIG. 6 is a similar view to FIG. 5 showing the pick-up means removing a first billet from the conveyor.

Figure 1:
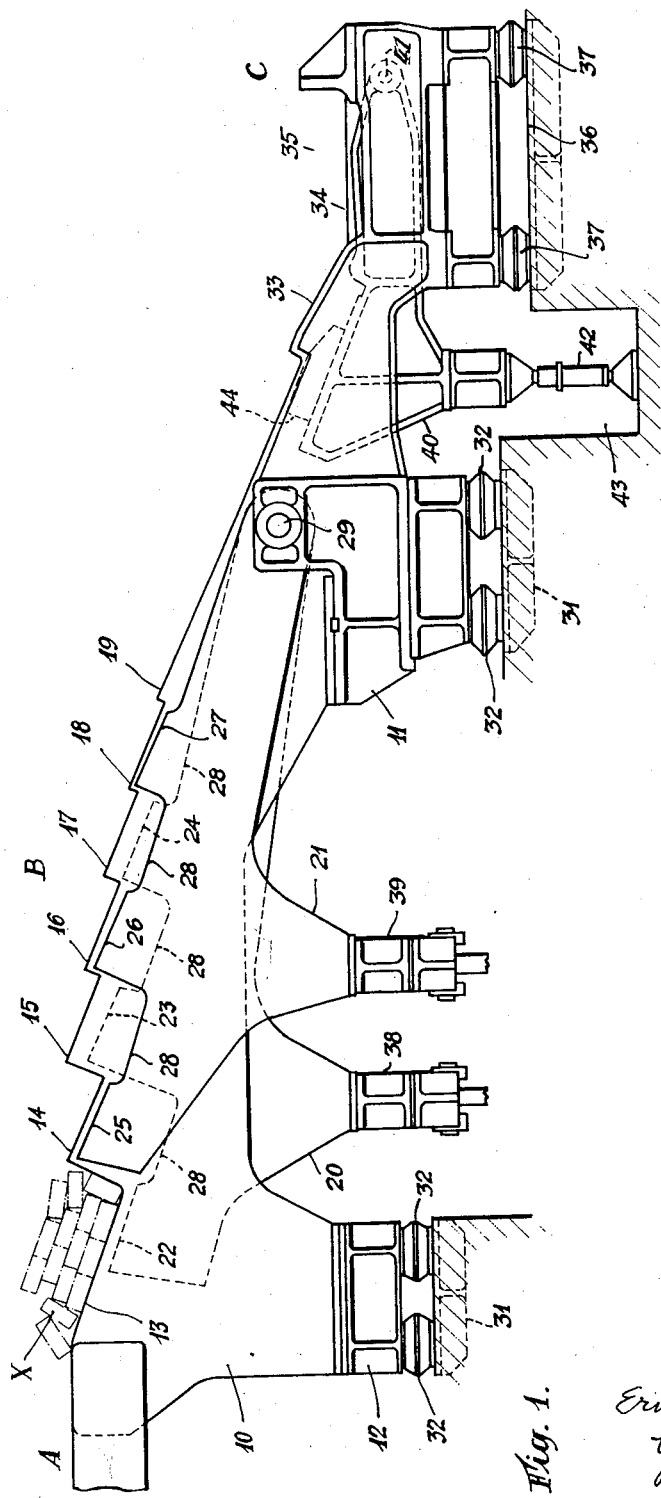
FIG. 1 is a side elevation of one form of apparatus made in accordance with this invention and showing the free end of the conveyor adjacent a billet loading platform or grid and its discharge end fitted with a billet run-off table.
Figure 2:
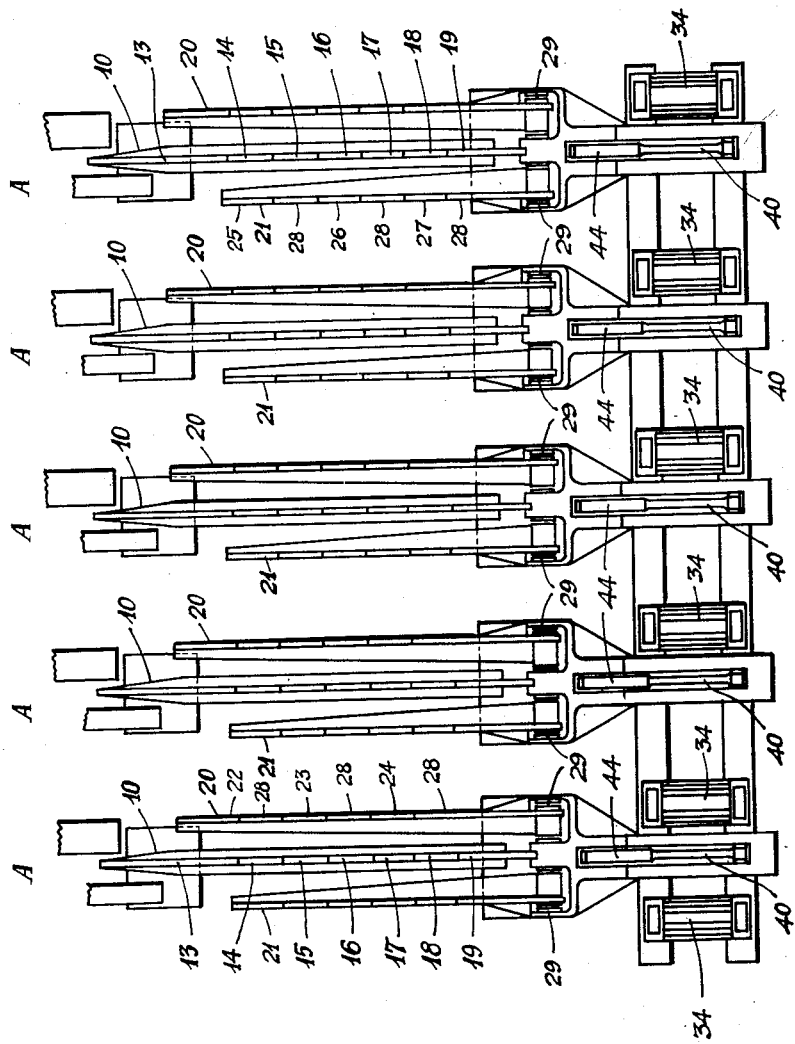
FIG. 2 is a plan of FIG. 1 drawn to a smaller scale.

Referring to FIGS. 1 to 6, A represents a conventional or other suitable form of billet loading grid or platform on to which billets are deposited in an indiscriminate heap or pile (not shown) and fed on to the conveyor B and C is the billet run-off table.

The conveyor B comprises a plurality of stationary billet-receiving and supporting elements 10 arranged in parallel spaced relation and supported in common at their front ends (the discharge end of the conveyor) by supports 11 and at their rear ends (the feed end of said conveyor) by supports 12. Each said stationary element is provided with a series of inclined billet-receiving and supporting surfaces 13, 14, 15, 16, 17, 18 and 19, each downwardly inclined towards the discharge end of the conveyor, and each being in upwardly stepped relation to its immediately preceding surface and each series being in alignment.

Interposed, as may be predetermined among the stationary elements and in parallel therewith, are movable elements constituting billet-lifting levers 20 and 21, one at each side of a stationary element, the billet-lifting levers 20 having three inclined surfaces 22, 23 and 24, the surface 24 being upwardly stepped in relation to 23 and the latter similarly stepped in relation to the surface 22 and the billet-lifting levers 21 having three similar inclined surfaces 25, 26 and 27 all downwardly inclined toward the discharge end of the conveyor, those 25, 26 and 27 of levers 21 being in advance, with respect to the front end of the conveyor, of the inclined surfaces 22, 23 and 24 of the levers 20. An inner length of each inclined surface of the levers 20 and 21 is cut away at 28 for the purpose to be described later.

The movable billet-lifting levers are mounted at their front ends on pivots 29 which have a common axis in the supports 11. The supports 11, 12, are mounted on separate foundation plates 31 through the medium of shock absorbers 32.

The front ends of the stationary elements 10 are mounted on the supports 11 which are extended at their upper faces to form extensions of the surfaces 19 and upwardly stepped exit surfaces 33 leading onto the run-off table C.

Rotatably driven rollers 34 are mounted at intervals within a gap 35 in the run-off table and on to which rollers billets are fed from the terminal inclined surfaces 19. The run-off table is mounted on a foundation 36 through the medium of shock absorbers 37.

The billet-lifting levers 20 and 21 are connected at their free ends, at the rear end of the conveyor, to floating support members 38 and 39, respectively, which are oscillatingly moved with a rise and fall movement in opposite relation to one another by suitable operating means, not shown.

For removing billets from the terminal inclined surface 19 of the stationary elements 10 at the discharge end of the conveyor B there are provided spaced apart billet pick-up levers 40 which are pivotally connected at 41 to the support 11 with the free ends of said levers 40 being oscillatable with a rise and fall movement by hydraulic actuating members 42 suitably located in a pit 43 in the foundation 36. The free ends of the pick-up levers 40 are adapted to pick up billets from the terminal inclined surfaces 19 of the stationary elements 10 and transfer them onto the inclined exit surfaces 33 from which they slide down onto the rollers 34 of the run-off table C.

For this purpose, the free ends of the pick-up levers 40 are provided with billet contacting members 44 which are slidably adjustable longitudinally of said levers so as to be positionable beneath one or more billets according to how many are to be transferred at a time onto the rollers 34 of the run-off table.

In operation, billets from the indiscriminate pile thereof (not shown) on the loading grid A are fed by said grid onto the feed end of the conveyor, that is to say, on the inclined surfaces 13 of the stationary billet-receiving and -supporting members 10, where they arrive substantially one after another to accumulate in a small pile of billets, say, for example, a pile of fifteen billets X as shown in chain lines in FIG. 1. As the most rearwardly extending series of billet-lifting levers 20 rise, the inclined surfaces 22 thereof lift a number of these billets, for example six, as shown in FIG. 3, of which four slide therefrom onto the succeeding inclined surfaces 14, when the surfaces 22 of levers 20 rise thereabove at the top of the upward stroke of said levers 20 while the remaining two billets fall with the lever 20 to drop back onto the surface 13 of the stationary elements 10 to join the remaining nine billets thereon as the lever 20 falls to its lowest level. Meanwhile, the series of billet-lifting levers 21 rise and their inclined surfaces 25 lift the four billets from the inclined surfaces 14 for two of them to slide onto the succeeding inclined surfaces 15, as shown in FIG. 4, while the remaining two billets fall with the levers 21 to drop back onto inclined surfaces 14. The levers 20 meanwhile rising again lift further billets from surface 13, which may be six again, or less, some or all of which slide down onto the surface 14 to join those left thereon by the levers 21.

It will be seen that billets are gradually fed forward along the conveyor by the rise and fall movement alternately of the levers 20 and 21 and eventually a single layer of billets arrives on the terminal inclined surfaces 19 of the stationary elements, as is shown in FIG. 5, whereat the oscillating pick-up levers 40 operate to remove a billet, on each upward movement of said lever, for each picked up billet to slide down the exit surface 33 onto the rollers 34 of the run-off table C, whereupon each billet is run off in the direction of its axis.

It will be seen that the billet contacting members 44 of the pick-up levers 40 have been adjusted so as to contact and pick up one billet at a time but it is to be understood that these members 44 can be adjusted higher up on the levers 40 and be of such a length from front to back so as to pick up two or more billets according to the full complement of side-by-side billets the run-off table can operatively cope with.

It is now convenient to point out that as the respective inclined surfaces 22, 23, 24 and 25, 26, 27 of the billet lifting levers 20 and 21 must rise above the inclined surfaces 13, 14, 15, 16, 17, 18 and 19 of the stationary elements 10, the cut away lengths 28, hereinbefore mentioned, of all the inclined surfaces of the billet-lifting levers are necessary so as to avoid fouling the billet-receiving inclined surfaces of the stationary elements 10 when the billet-lifting levers reach the highest point in their upward movement.

Figure 8:
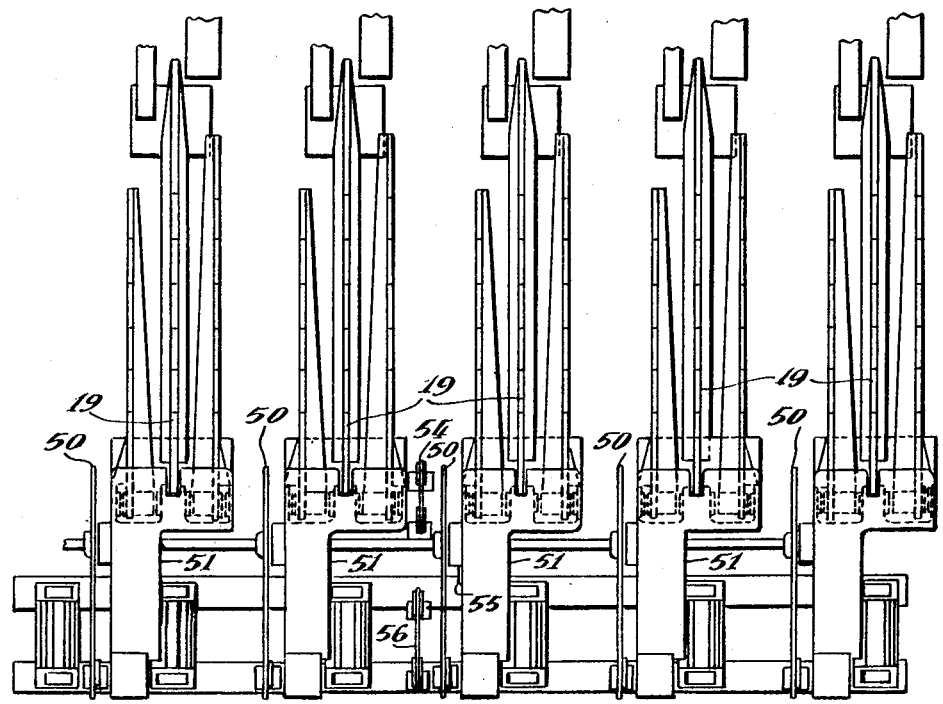
FIG. 8 is a plan view on a reduced scale of the apparatus depicted in FIG. 7.
Figure 7:
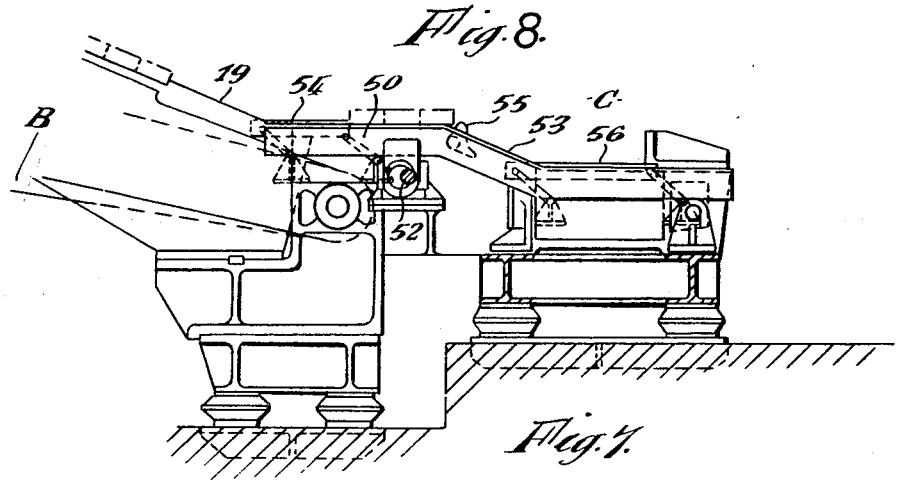
FIG. 7 is a fragmentary side elevation of an alternative form of apparatus made in accordance with this invention and showing only the discharge end of the conveyor and the billet run-off table of the apparatus.

Referring now to the construction depicted in FIGS. 7 and 8 this shows an alternative construction so far as the discharge end of the conveyor B is concerned and whereat the terminal inclined surfaces 19 are shortened and instead of the pick-up levers 40 shown in FIGS. 1 to 6 a series of side-by-side shuffle bars 50, 51 are provided for receiving the billets from the terminal inclined surfaces 19, alternate ones 51 of said bars being stationary and the remainder 50 being oscillatable by the drive 52 therefor whereby billets are traversed until they slide down the downwardly inclined discharge ends 53 of said shuffle bars to arrive on the run-off table C.

A depressible treadle switch 54 is provided between a pair of shuffle bars 50, 51 and is normally supported in a raised position relatively to the stationary shuffle bars 51 and is depressed by the billets as they arrive on the horizontal intake ends of said bars thus automatically arresting further operation of the billet-lifting levers at the completion of the cycle of movement of said levers. As the billets, being traversed by the shuffle bars, reach the downwardly inclined ends thereof, the treadle switch 54 is released thereby to bring into re-operation the billet-lifting levers 20, 21 which then deliver succeeding billets to the shuffle bars.

When the first one of a complement of billets on the shuffle bars slides down the inclined discharge ends of said shuffle bars for transfer to the run-off table C, a trip switch 55 is operated by said first billet to automatically cut out further operation of the shuffle bars.

Provided on the run-off table C is a depressible treadle switch 56 in normally raised position above the surface of the run-off table so as to be depressible sufficiently by the weight of the billet arriving thereon to permit said billet to be run off by the run-off table. The consequent release of said treadle switch 56 by the billet having been run off automatically brings the shuffle bars into re-operation whereupon the above operation is repeated.

If desired, instead of the alternating oscillatable and stationary shuffle bars being employed, shuffle bars, all of which are oscillatable, may be used for traversing the billets. In one such arrangement (not shown) of shuffle bars all of which are oscillatable in a circular path of movement in their own planes, one set of shuffle bars constituting alternate shuffle bars traverse forwardly the upper half of their path of movement meanwhile as the remaining set of shuffle bars traverse rearwardly the lower half of their path of movement whereby a billet is transferred by one set of shuffle bars to the other set as each set in turn completes a forward path of movement.

What I claim is:

1. In apparatus for the mechanical handling of billets, a conveyor comprising a plurality of stationary laterally-spaced elongate billet-receiving and -supporting elements extending in parallel relation, each of said elements having a plurality of steps the surface of each of which inclines downwardly from a loading end to a discharge end and being in upwardly stepped relation to an immediately preceding surface; a first set of levers having upwardly stepped inclined surfaces for lifting billets detained by alternate steps of the billet-receiving and -supporting elements; a second set of levers having upwardly stepped inclined surfaces for lifting billets detained by the remaining steps of said elements; and means for lifting and lowering the first and second sets of levers in out of phase relation, whereby billets detained by alternate steps of the stationary billet-receiving and -supporting elements are lifted by the lifting of the first set of said levers and the billets detained by the remaining steps of the stationary billet-receiving and -supporting elements are lifted by the lifting of the second set of said levers.

2. In apparatus for the mechanical handling of billets, a conveyor comprising a plurality of stationary laterally-spaced elongate billet-receiving and -supporting elements extending in parallel relation, each of said elements having a plurality of steps the surface of each of which inclines downwardly from a loading end to a discharge end and being in upwardly stepped relation to an immediately preceding surface; a first set of levers having upwardly stepped inclined surfaces for lifting billets detained by alternate steps of the billet-receiving and -supporting elements, said levers flanking on one side respective billet-receiving and -supporting elements; a second set of levers having upwardly stepped inclined surfaces for lifting billets detained by the remaining steps of said elements, said levers flanking on their other sides the respective elements; and means for lifting and lowering the first and second sets of levers in out of phase relation, whereby billets detained by alternate steps of the stationary billet-receiving and -supporting elements are lifted by the lifting of the first set of said levers and the billets detained by the remaining steps of the stationary billet-receiving and -supporting elements are lifted by the lifting of the second set of said levers.

3. In apparatus for the mechanical handling of billets, a conveyor comprising a plurality of stationary laterally-spaced elongate billet-receiving and -supporting elements extending in parallel relation, each of said elements having a plurality of steps the surface of each of which inclines downwardly from a loading end to a discharge end and being in upwardly stepped relation to an immediately preceding surface; a first set of levers having upwardly stepped inclined surfaces for lifting billets detained by alternate steps of the billet-receiving and -supporting elements, said levers flanking on one side respective billet-receiving and -supporting elements; a second set of levers having upwardly stepped inclined surfaces the steps of which are disposed in advance of those of the first set of levers to the extent of the distance between successive steps in the supporting elements for lifting billets detained by the remaining steps of said elements, said levers flanking on their other sides the respective elements; and means for lifting and lowering the first and second sets of levers in out of phase relation, whereby billets detained by alternate steps of the stationary billet-receiving and -supporting elements are lifted by the lifting of the first set of said levers and the billets detained by the remaining steps of the stationary billet-receiving and -supporting elements are lifted by the lifting of the second set of said levers.

4. In apparatus for the mechanical handling of billets, a conveyor comprising a plurality of stationary laterally-spaced elongate billet-receiving and -supporting elements extending in parallel relation, each of said elements having a plurality of steps the surface of each of which inclines downwardly from a loading end to a discharge end and being in upwardly stepped relation to an immediately preceding surface; a first set of levers pivotally mounted at the front, discharge, end of the conveyor and having upwardly stepped inclined surfaces for lifting billets detained by alternate steps of the billet-receiving and -supportnig elements; a second set of levers pivotally mounted at the front, discharge, end of the conveyor and having upwardly stepped inclined surfaces for lifting billets detained by the remaining steps of said elements; and means for lifting and lowering the first and second sets of levers in out of phase relation, whereby billets detained by alternate steps of the stationary billet-receiving and -supporting elements are lifted by the lifting of the first set of said levers and the billets detained by the remaining steps of the stationary billet-receiving and -supporting elements are lifted by the lifting of the second set of said levers.

5. In apparatus for the mechanical handling of billets, a conveyor comprising a plurality of stationary laterally-spaced elongate billet-receiving and -supporting elements extending in parallel relation, each of said elements having a plurality of steps the surfaces of each of which inclines downwardly from a loading end to a discharge end and being in upwardly stepped relation to an immediately preceding surface; a first set of levers pivotally mounted at the front, discharge, end of the conveyor and having upwardly stepped inclined surfaces for lifting billets detained by alternate steps of the billet-receiving and -supporting elements said levers flanking on one side respective billet-receiving and -supporting elements; a second set of levers pivotally mounted at the front, discharge, end of the conveyor and having upwardly stepped inclined surfaces for lifting billets detained by the remaining steps of said elements said levers flanking on their other side the respective elements; and means for lifting and lowering the first and second sets of levers in out of phase relation, whereby billets detained by alternate steps of the stationary billet-receiving and -supporting elements are lifted by the lifting of the first set of said levers and the billets detained by the remaining steps of the stationary billet-receiving and -supporting elements are lifted by the lifting of the second set of said levers.

6. In apparatus for the mechanical handling of billets, a conveyor comprising a plurality of stationary laterally-spaced elongate billet-receiving and -supporting elements extending in parallel relation, each of said elements having a plurality of steps the surface of each of which inclines downwardly from a loading end to a discharge end and being in upwardly stepped relation to an immediately preceding surface; a first set of levers pivotally mounted at the front, discharge, end of the conveyor and having upwardly stepped inclined surfaces for lifting billets detained by alternate steps of the billet-receiving and -supporting elements said levers flanking on one side respective billet-receiving and -supporting elements; a second set of levers pivotally mounted at the front, discharge, end of the conveyor and having upwardly stepped inclined surfaces for lifting billets detained by the remaining steps of said elements said levers flanking on their other sides the respective elements; means for lifting and lowering the first and second sets of levers in out of phase relation, whereby billets detained by alternate steps of the stationary billet-receiving and -supporting elements are lifted by the lifting of the first set of said levers and the billets detained by the remaining steps of the stationary billet-receiving and -supporting elements are lifted by the lifting of the second set of said levers; and a series of side by side shuffle bars for receiving billets from terminal steps of the first set of levers.

7. In apparatus for the mechanical handling of billets, a conveyor comprising a plurality of stationary laterally-spaced elongate billet-receiving and -supporting elements extending in parallel relation, each of said elements having a plurality of steps the surface of each of which inclines downwardly from a loading end to a discharge end and being in upwardly stepped relation to an immediately preceding surface; a first set of levers pivotally mounted at the front, discharge, end of the conveyor and having upwardly stepped inclined surfaces for lifting billets detained by alternate steps of the billet-receiving and -supporting elements said levers flanking on one side respective billet-receiving and -supporting elements; a second set of levers pivotally mounted at the front, discharge, end of the conveyor and having upwardly stepped inclined surfaces for lifting billets detained by the remaining steps of said elements said levers flanking on their other sides the respective elements. means for lifting and lowering the first and second sets of lever in out of phase relation, whereby billets detained by alternate steps of the stationary billet-receiving and -supporting elements are lifted by the lifting of the first set of said levers and the billets detained by the remaining steps of the stationary billet-receiving and -supporting elements are lifted by the lifting of the second set of said levers; a series of side by side shuffle bars for receiving billets from terminal steps of the first set of levers; and a depressible treadle switch for depression by billets as they are received by the shuffle bars, the depression of said switch arresting operation of the levers until it is released by said billets moving from engagement with said shuffle bars.

References Cited in the file of this patent

UNITED STATES PATENTS

| | | |
|---|---|---|
| 1,027,124 | Griffith | May 21, 1912 |
| 1,139,027 | George | May 11, 1915 |
| 2,995,235 | Maier | Aug. 8, 1961 |